(12) United States Patent
Batsch et al.

(10) Patent No.: US 8,827,292 B2
(45) Date of Patent: Sep. 9, 2014

(54) CYLINDER SHOCK ASSEMBLY

(75) Inventors: Christopher J. Batsch, Naperville, IL (US); Michael Brannigan, Narberth, PA (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/568,612

(22) Filed: Aug. 7, 2012

(65) Prior Publication Data

US 2014/0042724 A1    Feb. 13, 2014

(51) Int. Cl.
*B60G 15/00*    (2006.01)

(52) U.S. Cl.
USPC .................................. 280/124.161; 267/226

(58) Field of Classification Search
USPC ................ 280/124.146, 124.157, 124.158, 280/124.161; 267/64.11, 64.26, 64.28, 226; 188/297, 316, 317, 318
See application file for complete search history.

(56) References Cited

U.S. PATENT DOCUMENTS

| | | | | |
|---|---|---|---|---|
| 2,918,273 | A * | 12/1959 | Whisler et al. | 267/34 |
| 3,211,444 | A | 10/1965 | Avner | |
| 3,582,106 | A | 6/1971 | Keijzer | |
| 4,822,012 | A * | 4/1989 | Sketo | 267/221 |
| 4,828,237 | A | 5/1989 | Neff | |
| 5,454,550 | A * | 10/1995 | Christopherson | 267/221 |
| 6,135,434 | A * | 10/2000 | Marking | 267/64.26 |
| 6,311,962 | B1 | 11/2001 | Marking | |
| 7,017,893 | B1 * | 3/2006 | Vincenzo | 267/226 |
| 7,954,792 | B2 | 6/2011 | Adonakis | |
| 2011/0068552 | A1 | 3/2011 | Ryan et al. | |

FOREIGN PATENT DOCUMENTS

| | | |
|---|---|---|
| DE | 20 20 930 | 11/1971 |
| GB | 422686 | 1/1935 |

OTHER PUBLICATIONS

International Searching Authority, International Search Report and Written Opinion for PCT/US2013/029532 mailed Oct. 25, 2013, 11 pages.

* cited by examiner

*Primary Examiner* — Faye M Fleming
*Assistant Examiner* — Robert A Coker
(74) *Attorney, Agent, or Firm* — McDonnell Boehnen Hulbert & Berghoff LLP

(57) ABSTRACT

A cylinder shock assembly comprising a damper with a first end, and a second end that extends into an air cylinder float. The damper has a rod positioned in the air cylinder float with one end positioned within a cavity of the damper and another end affixed to an end cap attached to the air cylinder float. A primary coil spring is positioned within the air cylinder float, wherein when a load applied to the cylinder shock assembly is increased, an end of the damper move towards the end cap compressing air within the air cylinder float, wherein as the load is increased the primary coil spring is compressed and the volume of air within the air cylinder decreases resulting in an increased air pressure, and wherein the air cylinder float is a solid member that does not expand as the air pressure within increases during compression.

38 Claims, 14 Drawing Sheets

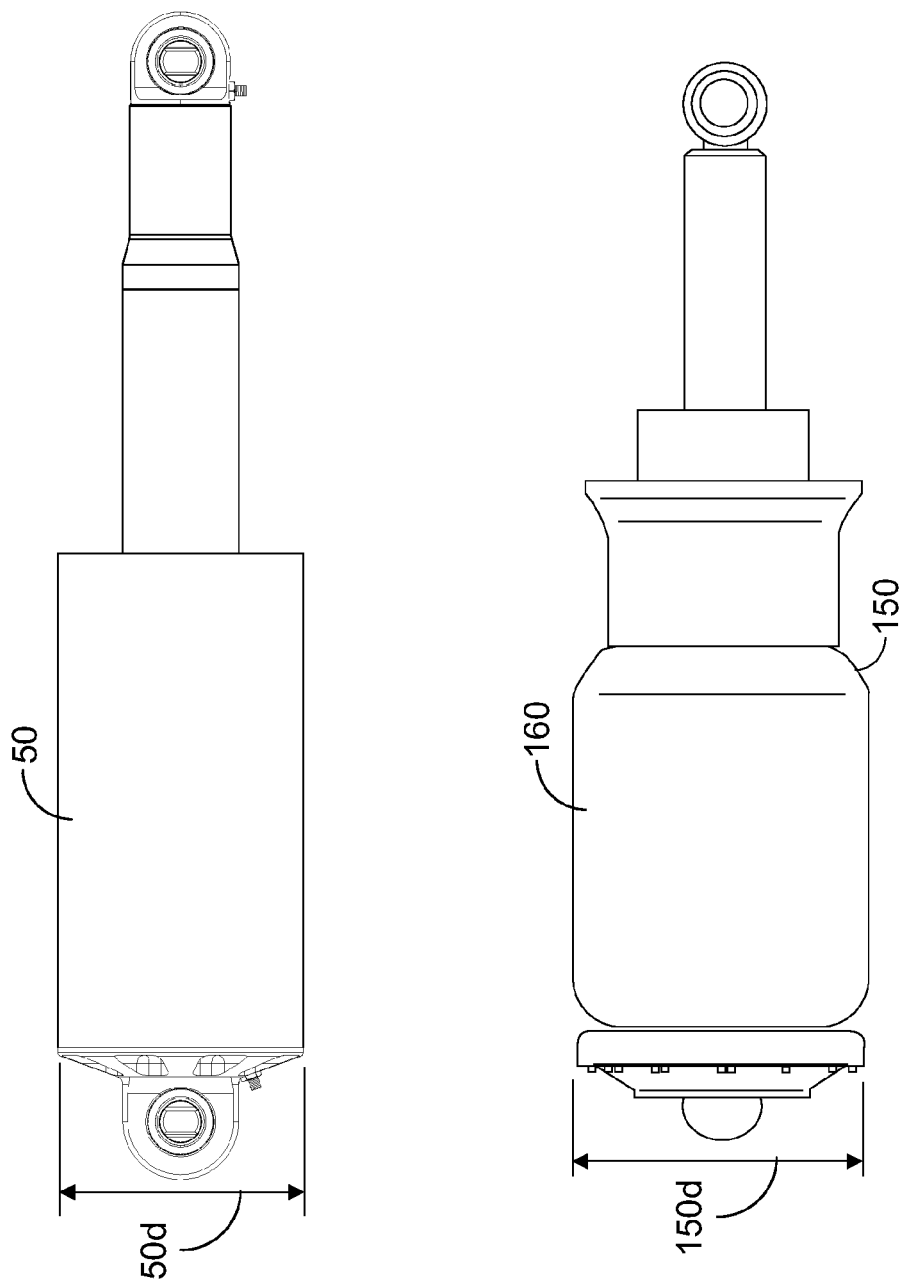

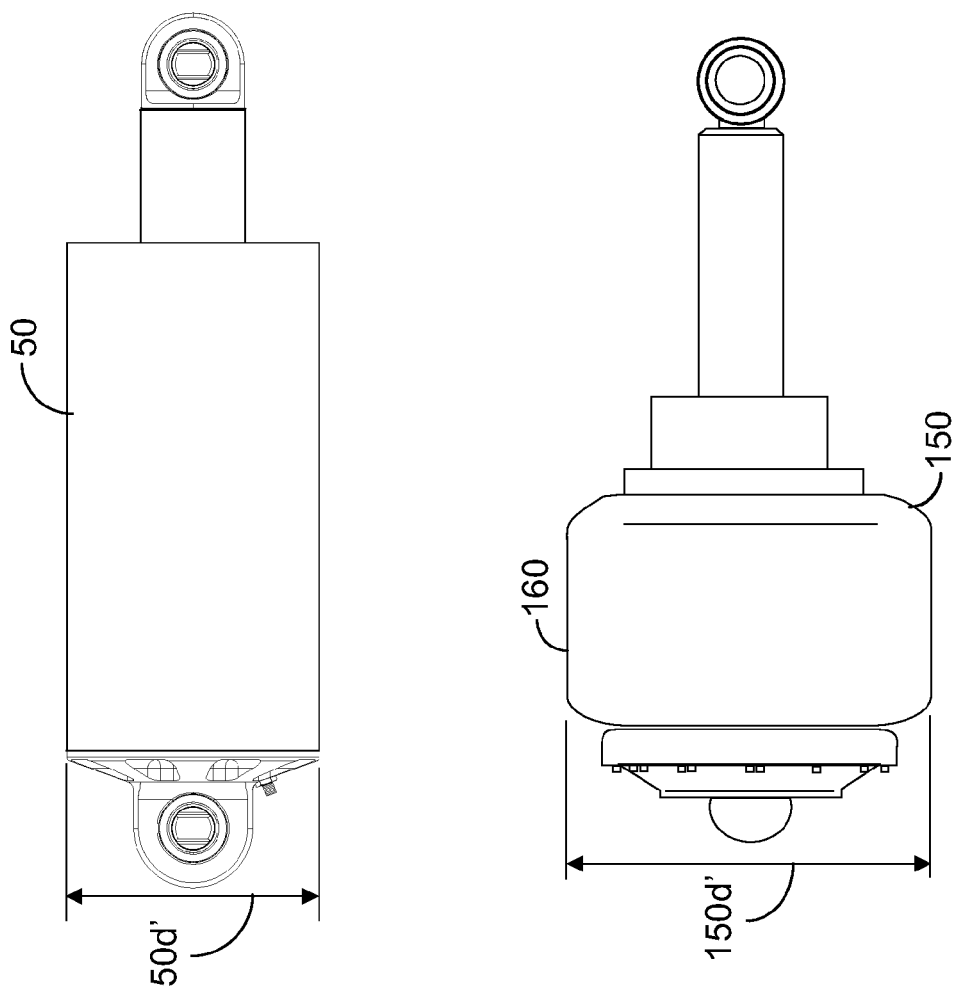

CYLINDER SHOCK ASSEMBLY

BACKGROUND

The present invention generally relates to vehicle suspensions. More particularly, the present invention relates to vehicle air suspension systems that include a strut assembly comprising an air cylinder, coil spring, and damper, which may be referred to as cylinder shock assembly or strut assembly. Prior strut assemblies have included a flexible air spring wherein the air spring includes a flexible membrane that expands as the strut is loaded. Typical air springs of this type with a flexible member provide a relatively low spring rate when compared to a mechanical spring. As a result, additional spring rate and roll stiffness has typically been required to be added to the vehicle, e.g., often in the form of an additional, independent mechanical coil spring to meet vehicle handling and stability objectives. Therefore, when using air springs with flexible or expandable membranes, an 'anti-roll bar' or 'sway bar' has often been utilized as the mechanism to achieve the desired auxiliary roll stiffness.

In typical air springs with a flexible membrane, the operating pressures that may be utilized are limited because of the current limitations on flexible membrane and rubber construction. Thus, the typical operating pressure at normalized ride height is limited to 80-100 psi, up to 120 psi, with maximum pressure at full compression at around 200 psi. It is known that by increasing the effective spring rate of the strut assembly, the vehicle may achieve a higher ride frequency, and increased roll performance and lateral stability performance. In particular, when the effective spring rate of the strut at the designed ride height is increased, the need for auxiliary anti-roll devices may be eliminated.

In some applications using an air spring with a flexible membrane, a coil spring may be added to increase the effective spring rate of the strut. However, to achieve a desired effective spring rate at the designed ride height, the strut may require a larger spring, a larger volume of air (and thus a flexible membrane with a larger diameter) or a combination of both. In many applications, however, the space constraints, or limited footprint available for a strut, do not allow for an air spring with a flexible membrane even when combined with a coil spring to achieve the desired increased effective spring rate at the designed ride height of a vehicle because of the increased size of the strut required to achieve the desired effective spring rate.

Therefore, in some applications it would be desirable to provide a strut capable of operating at increased operating pressures, to achieve a desired increased effective spring rate at the designed ride height that fits within existing space constraints. In addition, it would be desirable to provide a strut having an increased effective spring rate. For example, in some applications it may be desirable to provide a strut having an effective spring rate high enough so that the need for auxiliary roll resisting devices such as an anti-roll bar is not required to achieve the desired vehicle roll resistance and lateral stability.

In addition, typical air springs with a flexible membrane that also include a coil spring include a bump stop that is engaged once the coil spring is compressed to a certain point, which results in an abrupt change in spring rate which in turn causes an undesirable jolt to the vehicle's sprung mass. Accordingly it would be desirable to provide a strut that provides a continuously increasing spring rate without any abrupt changes in spring rate or spring rate slope to provide for smoother vehicle and passenger ride performance.

SUMMARY

In one aspect, a cylinder shock assembly is provided comprising a damper having a first end and a second end, wherein the first end includes a first mount and the second end of the damper extends into an air cylinder float. The damper includes a housing defining a cavity, the damper having a rod positioned in the air cylinder float, the rod having a first end positioned within the cavity of the damper and a second end affixed to an end cap that is connected to a first end of the air cylinder float. A first piston is affixed to the first end of the rod within the cavity of the damper, and a second piston is affixed to the damper, the second piston having one or more seals on an outer surface thereof that sealingly engage an inner surface of the air cylinder float. A primary coil spring is positioned within the air cylinder float and about the rod and positioned between the second piston and the end cap, wherein when a load applied to the cylinder shock assembly is increased, the second piston and the second end of the damper move towards the end cap compressing air within the air cylinder float, wherein as the load is increased the primary coil spring is compressed and the volume of air within the air cylinder decreases resulting in an increased air pressure, wherein the primary coil spring and the volume of air within the air cylinder float provide an effective or desired spring rate for the cylinder shock assembly, and wherein the air cylinder float is a solid member that does not expand as the air pressure within increases during compression.

In another aspect, a cylinder shock assembly is provided comprising a damper having a first end and a second end, wherein the first end includes a first mount and the second end of the damper extends into an air cylinder float. The damper includes a housing defining a cavity, the damper having a rod positioned in the air cylinder float, the rod having a first end positioned within the cavity of the damper and a second end affixed to a first end cap that is connected to a first end of the air cylinder float. A first piston is affixed to the first end of the rod within the cavity of the damper, and a second piston is affixed to the damper, the second piston having one or more seals on an outer surface thereof that sealingly engage an inner surface of the air cylinder float. A primary coil spring is positioned within the air cylinder float and about the rod and positioned between the second piston and the first end cap. When a load applied to the cylinder shock assembly is increased, the second piston and the second end of the damper move towards the first end cap compressing air within a first air pressure chamber. When the load is increased the primary coil spring is compressed and the volume of air within the first air pressure chamber decreases resulting in an increased air pressure. The damper extends through a second end cap positioned on a second end of the air cylinder float wherein a second air pressure chamber is formed in the air cylinder float between the second piston and the second end cap. The air cylinder float is a solid member that does not expand as the air pressure within increases during compression.

In yet another aspect, a first cylinder shock assembly, configured as the cylinder shock assembly described in the previous paragraph is provided, and a second cylinder shock assembly configured as the cylinder shock assembly described in the previous paragraph is provided. A first end of a first air hose is connected to the first end cap of the first cylinder shock assembly and a second end of the first air hose is connected to the second end cap of the second cylinder shock assembly such that the first air pressure chamber in the first cylinder shock assembly is in communication with the second air pressure chamber of the second cylinder shock assembly.

In a further aspect, a method of adjusting the effective spring rate of a cylinder shock assembly is provided comprising the steps of providing a cylinder shock assembly comprising a damper having a first end and a second end, wherein the second end of the damper extends into an air cylinder float; wherein the damper includes a housing defining a cavity, the damper having a rod positioned in the air cylinder float, the rod having a first end positioned within the cavity of the damper and a second end affixed to an end cap that is connected to a first end of the air cylinder float, a first piston affixed to the first end of the rod within the cavity of the damper, a second piston affixed to the damper, the second piston having one or more seals on an outer surface thereof that sealingly engage an inner surface of the air cylinder float, a primary coil spring positioned within the air cylinder float and about the rod and positioned between the second piston and the end cap, wherein the primary coil spring and the volume of air within the air cylinder float provide an effective spring rate for the cylinder shock assembly, wherein the air cylinder float is a solid member that does not expand as the air pressure within increases during compression, and the step of adding a volume of fluid into the air cylinder float to increase the effective spring rate of the cylinder shock assembly to a first effective spring rate.

BRIEF DESCRIPTION OF THE DRAWINGS

Exemplary embodiments of the invention are described herein with reference to the drawings, wherein like parts are designated by like reference numerals, and wherein:

FIG. 10 is a side view of the cylinder shock assembly 50 shown in FIGS. 1-4 in a fully extended state positioned next to a typical strut 150 with an air spring having a flexible member shown in a fully extended state;

FIG. 10A is a side view of the cylinder shock assembly 50 shown in FIGS. 1-4 in a fully compressed state positioned next to a typical strut 150 with an air spring having a flexible member shown in a fully compressed state;

FIG. 11 is a top view of cylinder shock assembly 250 plumbed with cylinder shock assembly 150a;

DETAILED DESCRIPTION OF THE INVENTION

Figure 1:
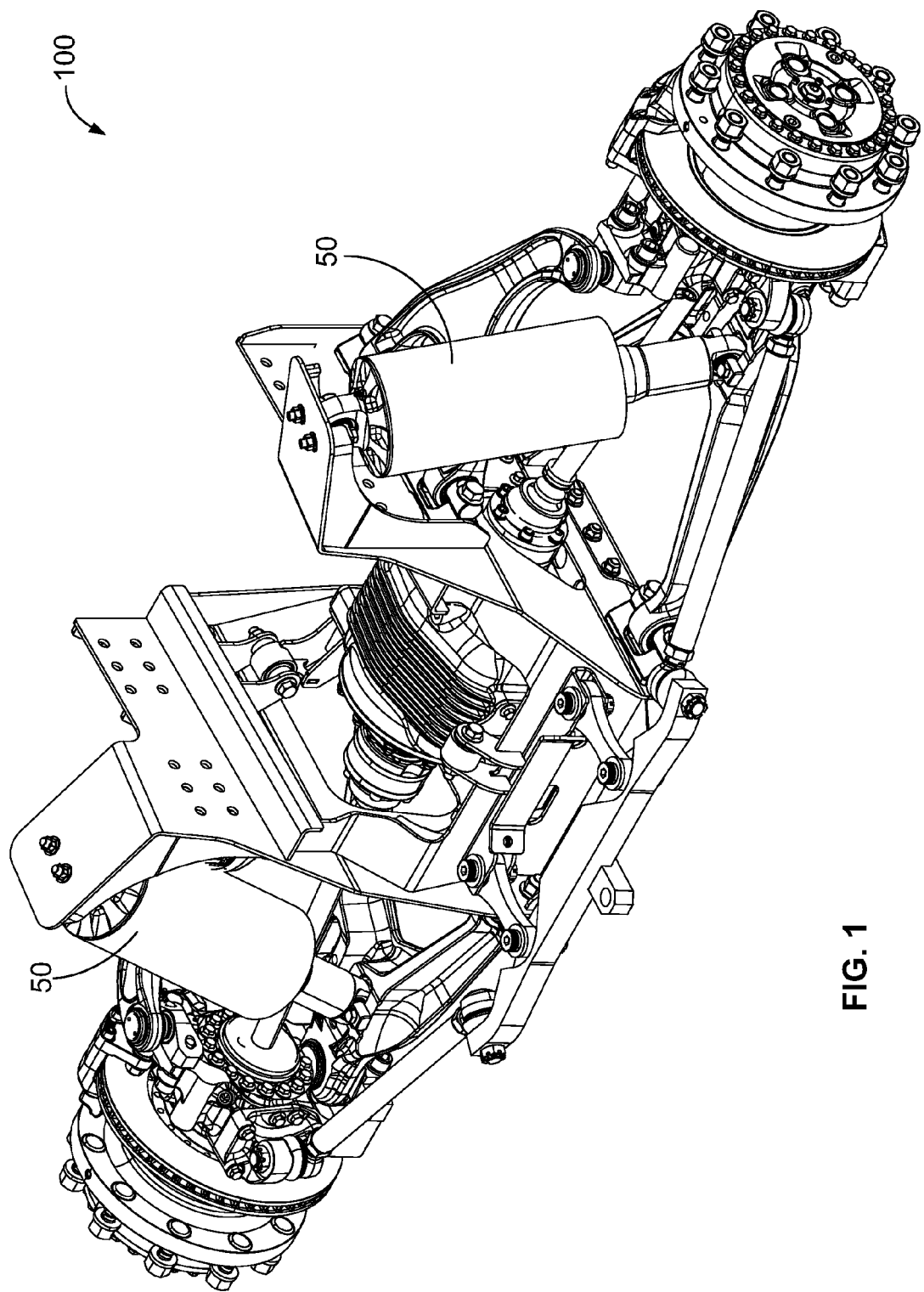
FIG. 1 is a perspective view of air cylinder shock assemblies 50 installed on a vehicle suspension 100.
Figure 2:
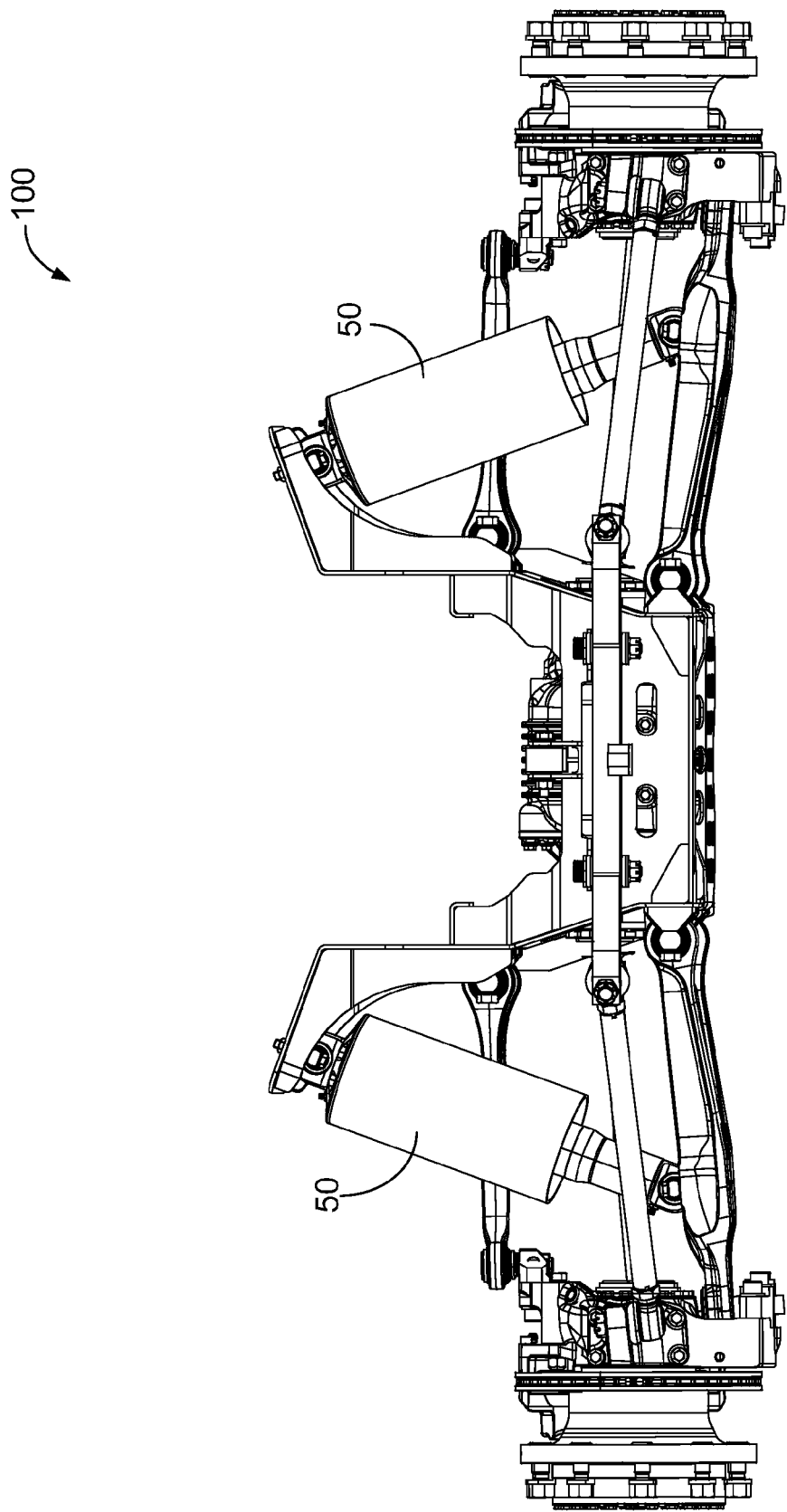
FIG. 2 is a front view of cylinder shock assemblies 50 installed on the vehicle suspension 100 shown in FIG. 1.
Figure 3:
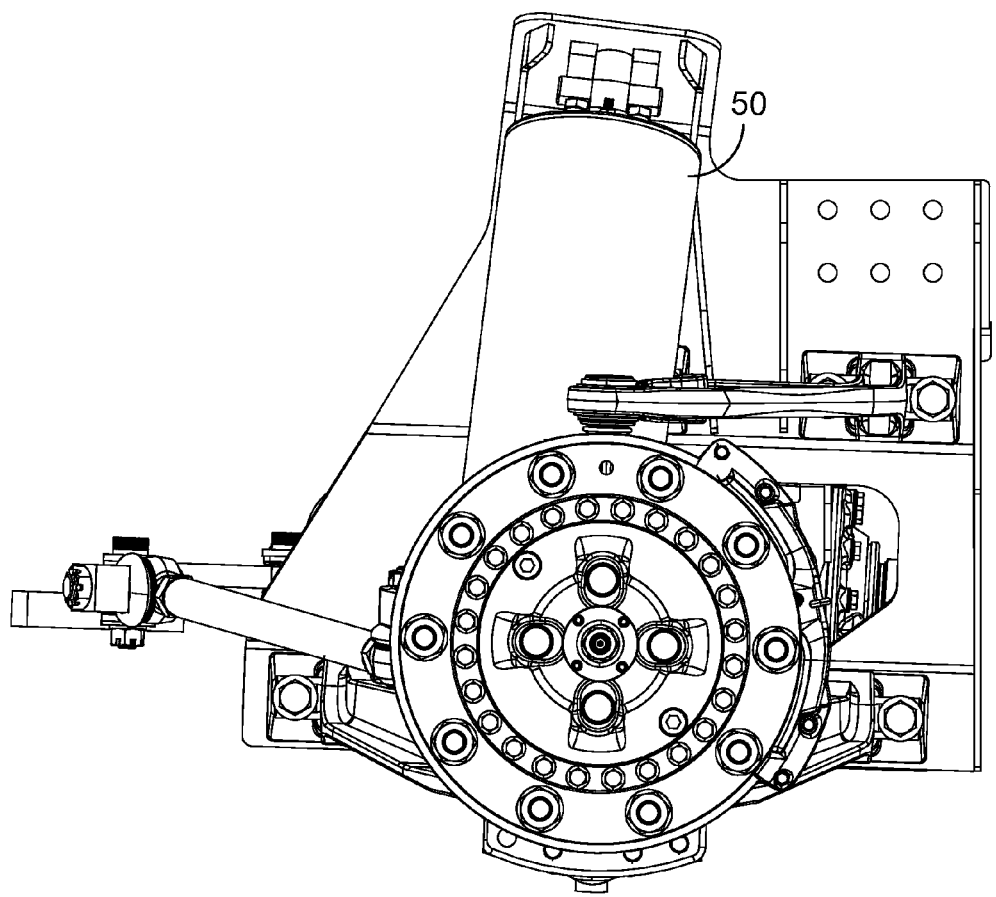
FIG. 3 is left side view of cylinder shock assembly 50 installed on the vehicle suspension 100 shown in FIGS. 1 and 2.

FIG. 1 is a perspective view of a vehicle suspension 100 having cylinder shock assemblies 50 attached thereto. FIG. 2 is a front view of the vehicle suspension 100 having cylinder shock assemblies 50 positioned on the left and right sides of the vehicle suspension 100. FIG. 3 is a right side view showing cylinder shock assembly 50 positioned on the vehicle suspension. The cylinder shock assemblies 50 may also be referred to herein as struts and used on vehicles to absorb shock and dampen movement of the suspension system to provide for improved ride performance and vehicle stability. The cylinder shock assemblies may be used with a wide variety of vehicles, and is not limited to use with the vehicle suspension 100. For purposes of this description, unless specifically described otherwise, hereinafter, the term "vehicle" refers broadly to any vehicle or a trailer. In this way, for example, a vehicle suspension refers to a suspension used on a motorized vehicle or a trailer as examples. In addition, the use of cylinder shock assembly 50 may have other applications, beyond vehicle use, and could be used, e.g., to stabilize machinery or in a simulator.

Figure 4:
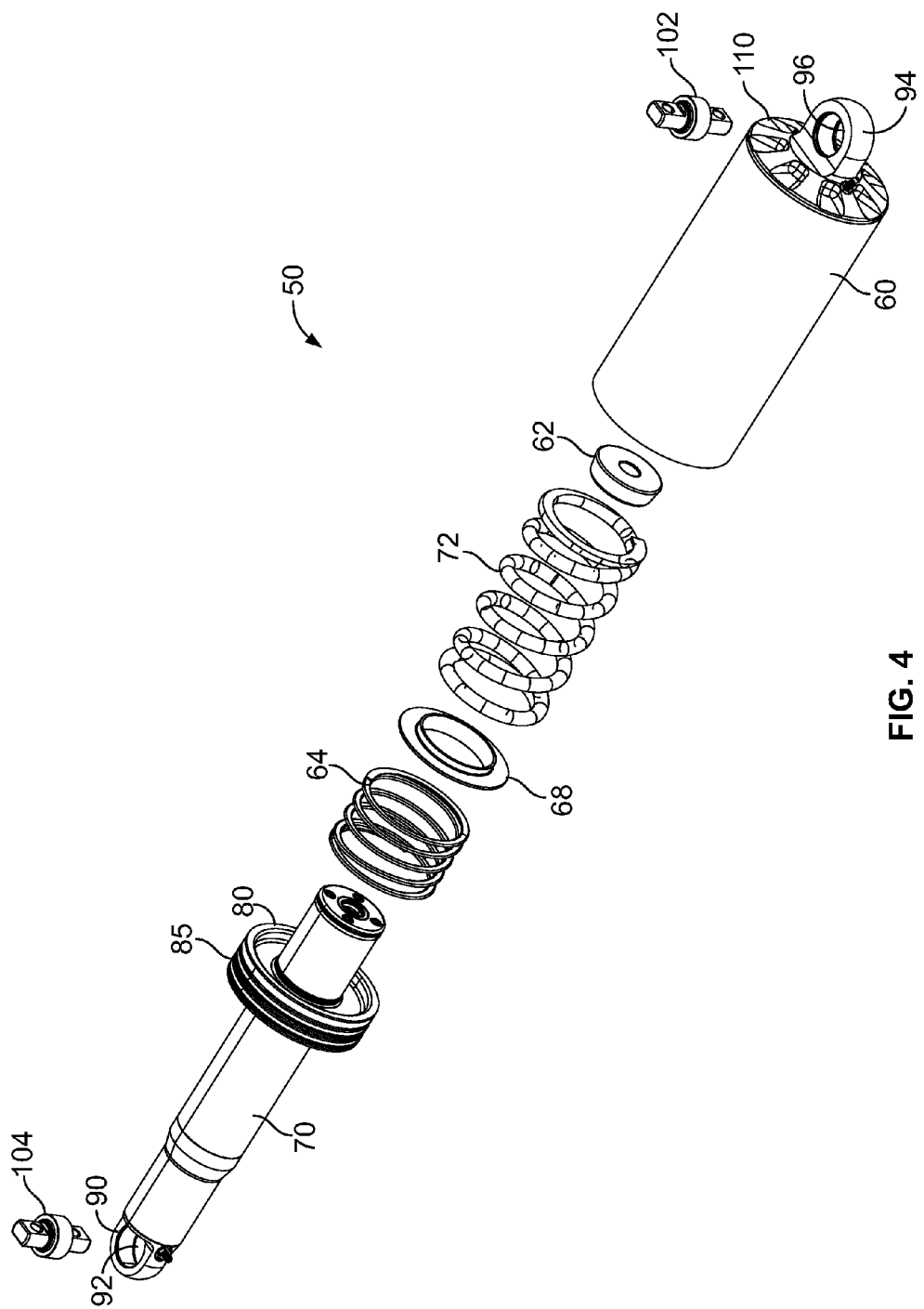
FIG. 4 is an exploded view of the cylinder shock assembly 50 shown in FIGS. 1-3.

FIG. 4 shows an exploded view of cylinder shock assembly 50 shown in FIGS. 1-3. Cylinder shock assembly 50 includes an air cylinder float 60 that is a tubular member, and an end cap 110 having a first mount 94 with a through-hole 96 that may be used to mount the upper end of cylinder shock assembly 50 to a vehicle using bar pin 102. The end cap 110 may be threaded such that an end of the air cylinder float 60 may be threaded thereto. In a preferred embodiment an O-ring is positioned adjacent the threads to form a seal. Alternately, the end cap 110 could be welded to the air cylinder float 60. The other end of cylinder shock assembly 50 includes a damper 70. The end of damper 70 includes a second mount 90 with a through-hole 92 that may be used to mount the lower end of cylinder shock assembly 50 to a vehicle using bar pin 104. Attached to damper 70 is spring support 80 positioned on a piston 85. Positioned within air cylinder float 60 is primary coil spring 72 and tender or supplemental spring 64 with spring adaptor 68 positioned between primary coil spring 72 and tender or supplemental spring 64. Also included is a bump stop 62 positioned adjacent the end cap 110 which serves as stop when the end of damper 70 fully compresses springs 72 and 64.

In FIG. 4, the tender or supplemental spring 64 is shown positioned to abut spring support 80 and primary coil spring 72 is shown positioned to abut end cap 110 within air cylinder float 60. However, the positioning of primary coil spring 72 and tender or supplemental spring 64 may be reversed such that the tender or supplemental spring 64 abuts end cap 110 and the primary coil spring 72 abuts spring support 80 within air cylinder float 60. The tender or supplemental spring 64 is used to keep the primary coil spring 72 properly positioned upon rebound and to keep the primary coil spring 72 from being loose when the cylinder shock assembly 50 is fully extended, although in some applications the tender or supplemental spring 64 may not be needed.

Figure 7:
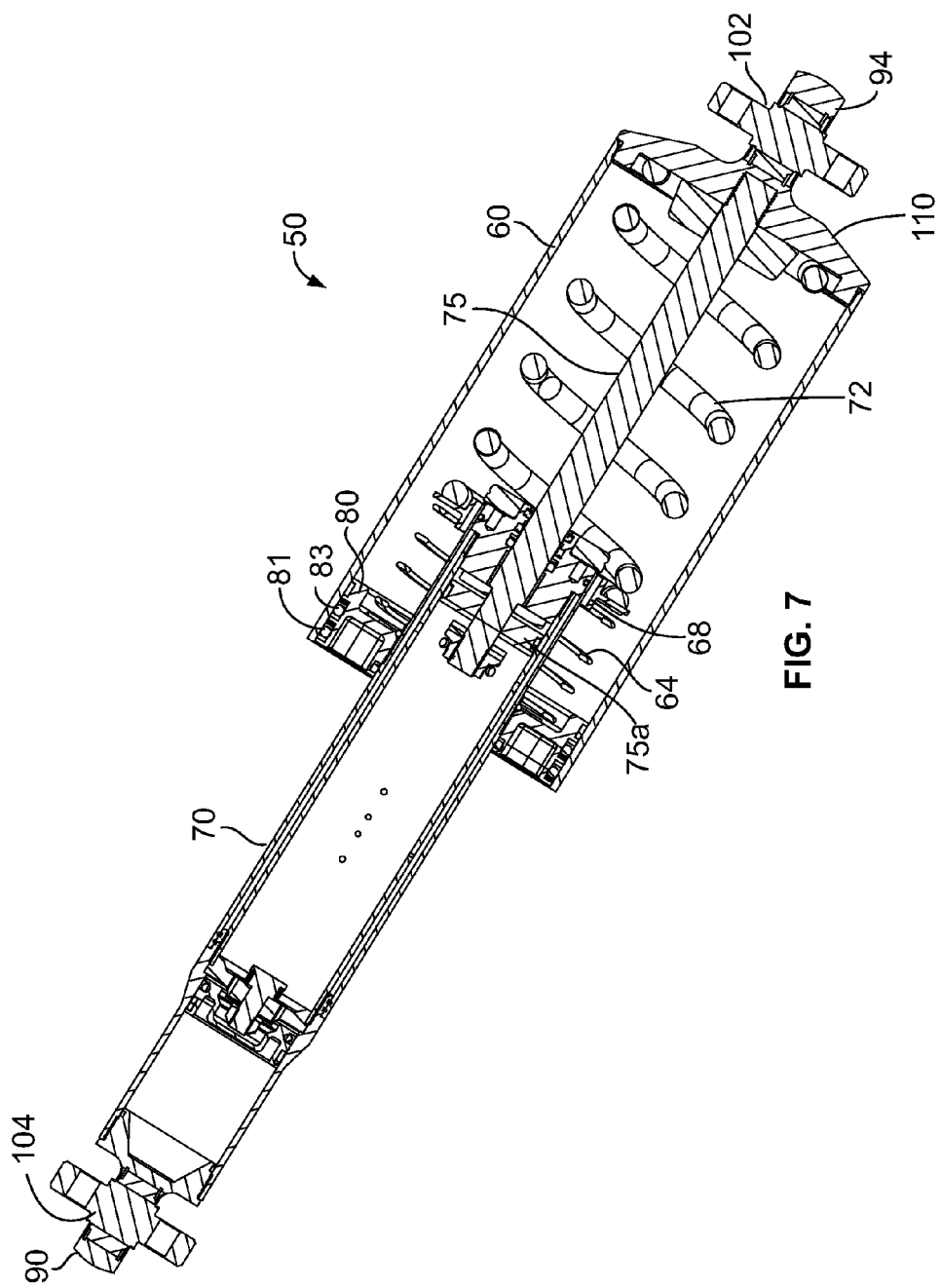
FIG. 7 is a sectional view of cylinder shock assembly 50 shown in FIGS. 1-4 in a fully extended state.
Figure 8:
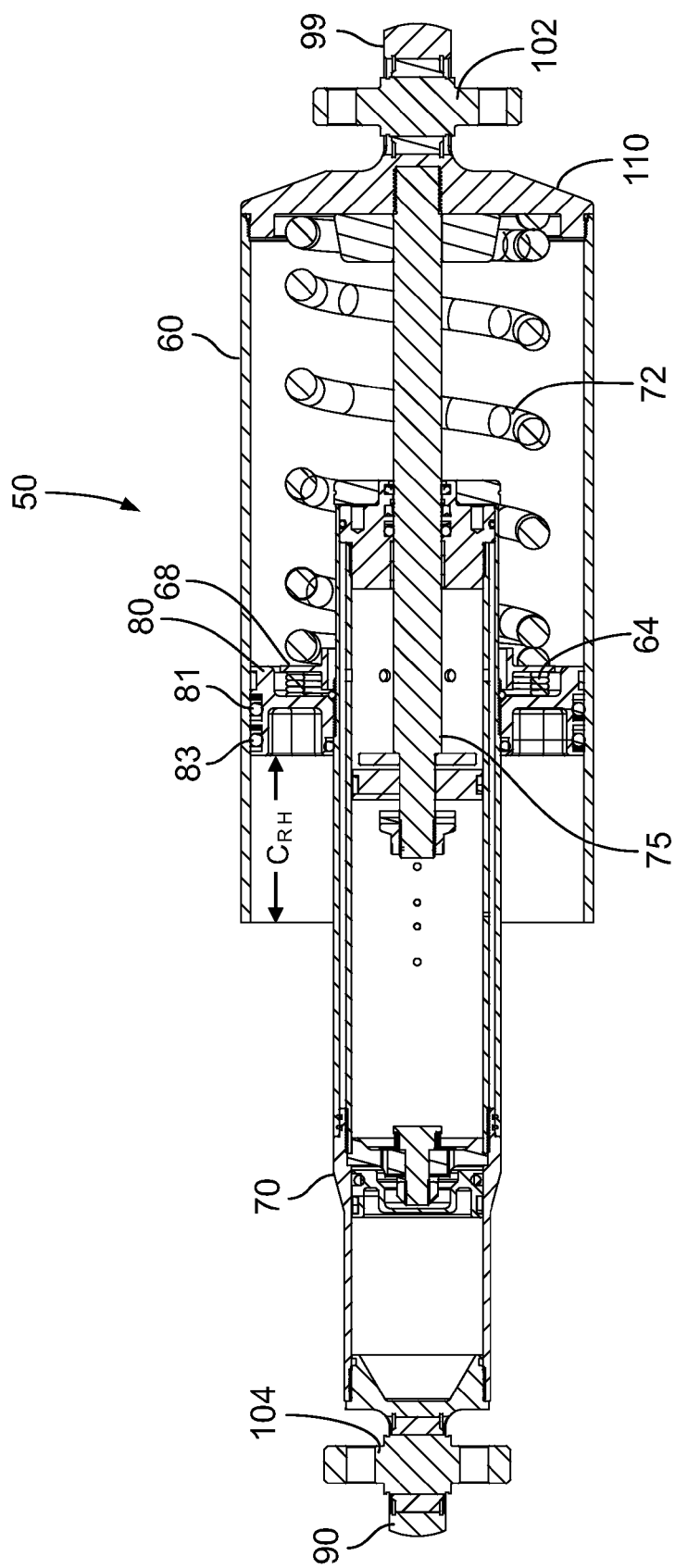
FIG. 8 is a sectional view of the cylinder shock assembly 50 shown in FIGS. 1-4, and 7 in a partially compressed state at a desired ride height.
Figure 9:
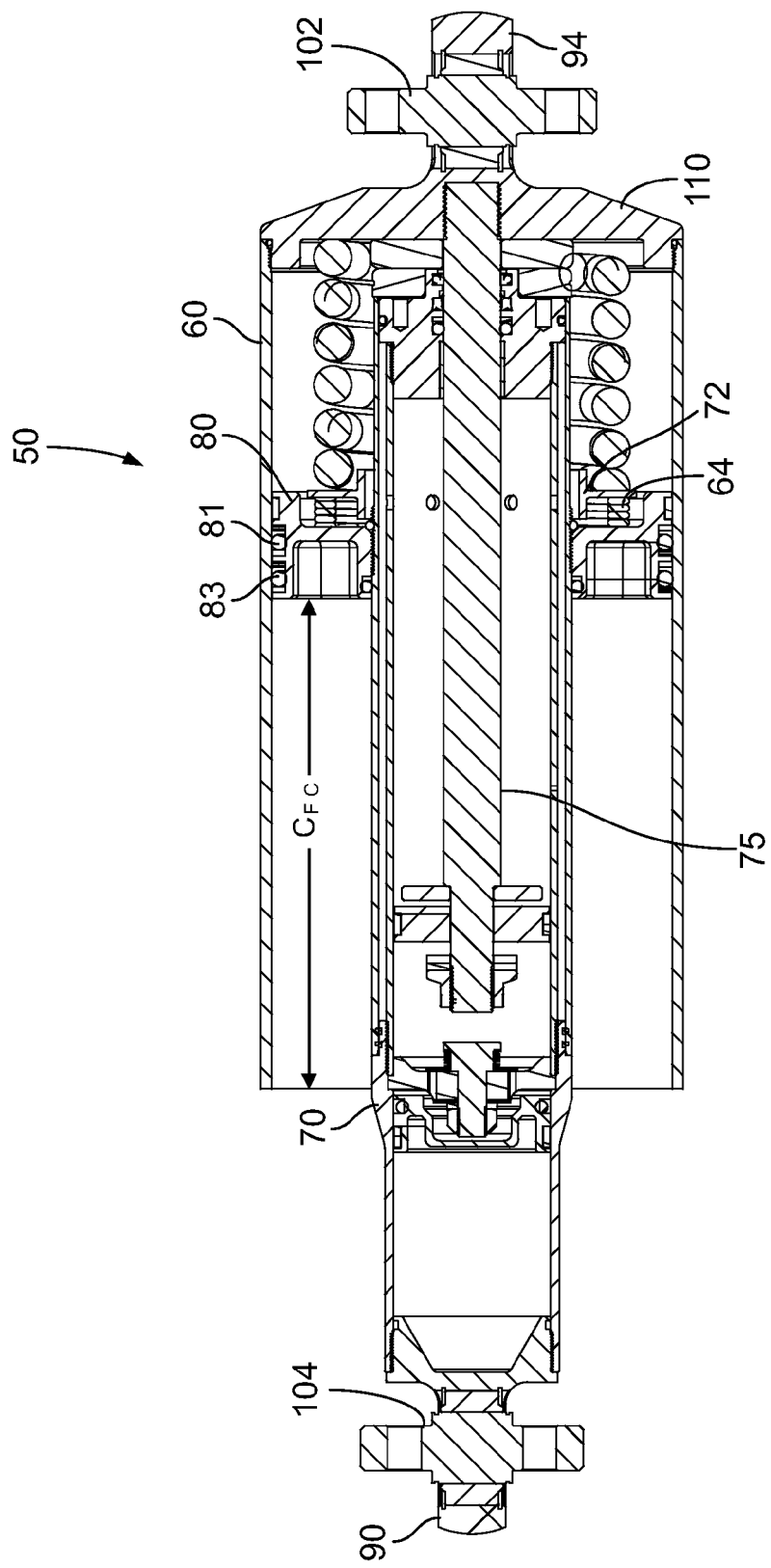
FIG. 9 is a sectional view of the cylinder shock assembly 50 shown in FIGS. 1-4, and 7-8 in a fully compressed state.

The cylinder shock assembly 50 shown in FIGS. 1-4 is designed to operate at higher service air pressures than a typical air spring cylinder having a flexible membrane, although it may also operate at lower service air pressures as well. When a load is applied to the cylinder shock assembly 50, the spring support 80 attached to damper 70 moves longitudinally within air cylinder float 60 compressing the primary coil spring 72 and tender spring 64 and reducing the volume within the air cylinder float 60, and thereby increasing the pressure of the air inside the air cylinder float. As shown in FIGS. 7-9, seals 81 and 83 are positioned on the outside surface of spring support 80 and are used to seal the air within the air cylinder float 60 as the air pressure increases. Similarly, the end cap 110 and air cylinder float 60 are sealed to prevent air from leaking and to maintain the air pressure within the air cylinder float 60. The air cylinder float 60 does not expand as the air pressure within increases. The air cylinder float 60 is made of a non-flexible material, preferably a metal which is able to withstand significantly increased air pressures within when compared to an air spring having a flexible membrane. In a preferred embodiment, the air cylinder float 60 is made of mild steel DOM tubing.

As noted above, in typical air springs with a flexible membrane, the operating pressures that may be utilized are limited due to the current limitations on flexible membrane and rubber construction. As a result, the typical normalized ride height operating pressure is limited to 80-100 psi, up to 120 psi, with maximum pressure at full compression at around 200 psi. However, with cylinder shock assembly 50 having solid, non-expandable air cylinder float 60, significantly higher operating pressures may be used. For example, cylinder shock assembly 50 can be arranged in a configuration to operate at ride height at 175-250 psi air pressure, with a peak air pressure of 1000 psi air pressure or higher. Other example configurations of cylinder shock assembly 50 with different ride heights, operating air pressures at ride height, and peak air pressures are also possible, including air pressures well in excess of 1000 psi.

The effective spring rate of an air cylinder that also includes a coil spring is a function of the spring rate of the coil spring and the pressure of the air within the air cylinder float 60. As used herein, the effective spring rate refers to the combined spring rate of the coil spring and air pressure within the air cylinder float 60. By increasing the effective spring rate of the strut, through, e.g., higher air pressures in the air cylinder float 60 and/or the addition of fluid in the air cylinder float to reduce the volume of the air in the air cylinder float, the vehicle may achieve a higher ride frequency, and increased roll performance and lateral stability performance. Therefore, cylinder shock assembly 50 is able to provide an increased effective spring rate because of its ability to operate at higher service air pressures. In particular, the effective spring rate of the strut at the designed ride height is high enough that the need for auxiliary anti-roll devices may be eliminated.

In a preferred embodiment of the cylinder shock assembly 50 shown, the effective spring rate at the designed ride height may be 1500 to 2000 pounds/inch. The designed ride height is typically defined as the distance between the wheel center and the underside of the chassis frame. It could also be the distance between a point on the suspension system (unsprung mass) and a point on the body (sprung mass) such as the distance between mounting points on a suspension spring or strut. On typical air suspension systems it is desirable that this ride height should remain constant regardless of body mass or payload therefore the vehicle height and 'design ride height' would remain constant whether the vehicle was loaded to curb weight or at its' maximum Gross Vehicle Weight (GVW) loading. Maintaining this ride height can provide benefits such as maintaining vehicle height, ground clearance, roll center height position, driveline angles and providing consistent stability and handling properties.

Maintaining the system design ride height is typically managed by a 'height control sensor' that will react to changes in ride height by either introducing more air into the air springs/struts or allowing air to be exhausted from the air springs/struts. These air management systems can be tuned in terms of responsiveness to react to in-service dynamic changes to ride height position when traversing uneven terrain. These systems may also be programmed (or manually adjusted) to provide 'self-leveling' features such that the ride height at left wheels vs. right wheels or front wheels vs. rear wheels can be adjusted to reduce or maintain body angles on grades or side slopes. The designed ride height correlates to the amount the cylinder shock assembly 50 is compressed at expected operating vehicle weights. Therefore, as used herein, the term "designed ride height" refers to the distance the cylinder shock assembly is compressed. Therefore, a designed ride height of 4 inches refers to the cylinder shock assembly 50 being compressed 4 inches at expected operating vehicle weights.

With the cylinder shock assembly 50 having such a high effective spring rate at the designed ride height, the need for auxiliary roll resisting devices such as an anti-roll bar may not be required to achieve the desired vehicle roll resistance and lateral stability. In addition, in order for an air spring with a flexible membrane to achieve such a high effective spring rate, the air spring would be required to have a significantly increased diameter to achieve the effective spring rate at the designed ride height. For example, in a preferred embodiment of the cylinder shock assembly 50 having a 9 inch distance of compression, the diameter of the air cylinder float is 7.375 inches with a wall thickness of 3/16ths of an inch. As shown in FIGS. 10 and 10A below, in a conventional air spring with a flexible membrane, with typical operating vehicle air pressures of 80-110 psi, with the same 9 inch distance of compression, the diameter would need to be 10.1 inches in the fully extended state, and 11.5 inches in the fully compressed state. However, to achieve the same effective spring rate at the designed ride height as cylinder shock assembly 50, the air spring with flexible membrane would need to be even larger, with a larger volume or air and/or larger coil spring. In many applications there simply is not enough space to accommodate an air spring having a flexible membrane, even when an included primary coil spring is used, because it is required to have such a larger diameter on the order of at least 33 to 50 percent larger than the cylinder shock assembly 50. As a result, there are many applications where the use of cylinder shock assembly 50, with a solid, non-expandable air cylinder float, is advantageous, particularly on vehicles where there is limited space to position the cylinder shock assembly.

In the preferred embodiment of cylinder shock assembly 50 shown in FIG. 4, as noted above, the spring support 80 which is positioned on a piston may travel 0-9 inches longitudinally within the air cylinder float 60. The bump stop 62 is preferably comprised of UHMWPE, also known as ultra-high molecular weight polyethylene. Similarly, spring adaptor 68 is also preferably comprised of UHMWPE. Spring support 80 is preferably comprised of 6061-T6 aluminum alloy, as are end cap 110 and upper mount 94 and lower mount 90. The damper 70 is comprised of various steel components as is conventional in the art. Preferably, damper 70 is filled with a fluid, such as a hydraulic fluid, although the cavity the damper may be filled with an air such that damper 70 is an air damper.

Figure 5:
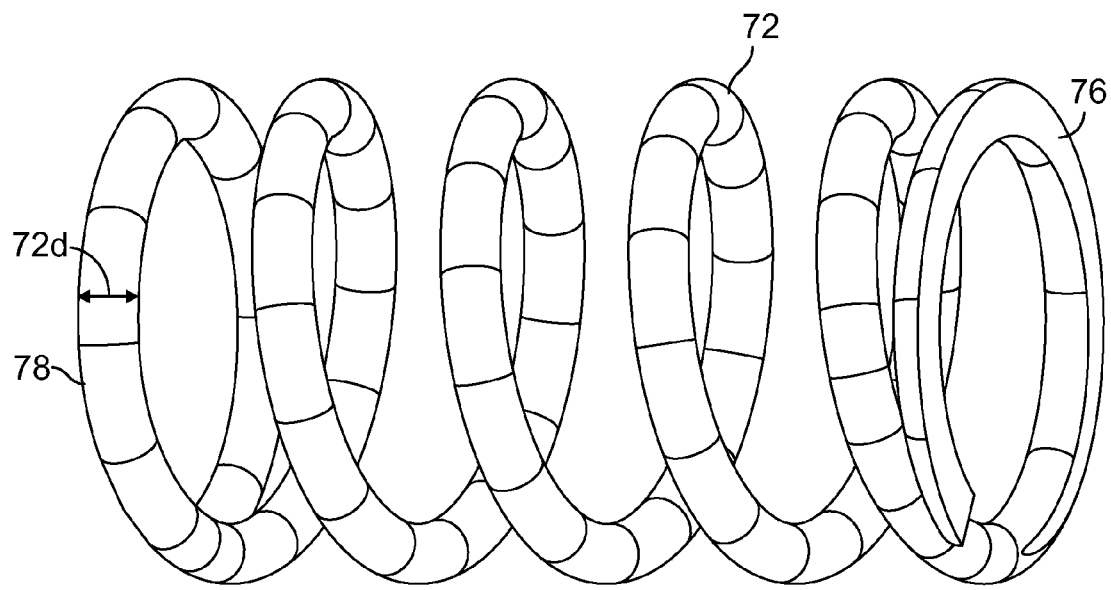
FIG. 5 is a perspective view of primary coil spring 72.

FIG. 5 shows a perspective view of primary coil spring 72 having a first end 76 and second end 78. In the preferred embodiment of cylinder shock assembly 50 described above with respect to FIG. 4, primary coil spring 72 has a spring rate of 600 pounds/inch, has a wire diameter 72*d* of 0.656 inches, an inner coil diameter of 4.213 inches, an outer coil diameter of 5.525 inches, a free length of 10 inches, and is comprised of 5160 spring steel.

Figure 6:
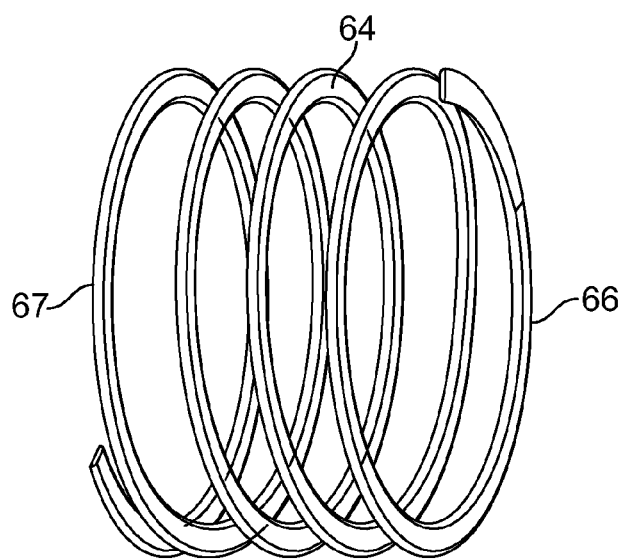
FIG. 6 is a perspective view of supplemental spring 64.

FIG. 6 shows a perspective view of tender or supplemental spring 64 having a first end 66 and second end 67. In the preferred embodiment of cylinder shock assembly 50 described above with respect to FIG. 4, tender or supplemental spring 72 has a spring rate of 10 pounds/inch, a 0.125 inch×0.375 inch cross section, an inner coil diameter of 4.75 inches, an outer coil diameter of 5.5 inches, a free length of 4 inches, and is comprised of flat tempered spring steel.

FIG. 7 is a cross-sectional view of cylinder shock assembly 50 shown in a fully extended state. In FIG. 7, the damper 70 is attached to spring support 80 near the end of air cylinder float 60. Seals 81 and 83 positioned in grooves or seats on the outside surface of spring support 80 are used to seal the air within the air cylinder float 60. In a preferred embodiment the seals 81 and 83 are Viton O-ring seals that are compressed between the inner surface of air cylinder float 60 and the outside surface of spring support 80. Other sealing means may be used, in addition to or as an alternative to seals 81 and 83, to provide an effective seal at the desired operating pressures as the spring support extends from full extension to full compression. For example, in some applications a single O-ring could be used, or more than two O-rings could be used, to provide an effective seal.

As shown in FIG. 7, the distance between the inward facing surface of spring support 80 and the inward facing surface of end cap 110 is greater than the length of primary coil spring 72. In order to keep the primary coil spring 72 properly seated, the tender or supplemental spring 64 having a very low spring rate (on the order of 10 pounds/inch) is used to bias the primary coil spring 72 in position against end cap 110. Spring adaptor 68 is positioned between primary coil spring 72 and tender or supplemental spring 64 and provides a seat for those springs. In this example, the primary coil spring 72, spring is shown abutting end cap 110. A first piston 75*a* is attached to a first end of rod 75 within damper 70 and a second end of rod 75 is attached to end cap 110.

In FIG. 8, the cylinder shock assembly 50 is shown compressed to its designed ride height. As can be seen, the tender or supplemental spring 64 is fully compressed at the designed ride height. At the design ride height, the spring support 80 has moved a distance $C_{RH}$. At this distance of compression, $C_{RH}$, the effective spring rate of the cylinder shock assembly 50 may be between 1500 and 2000 pounds/inch. In addition, the air pressure within the air cylinder float 60 may be on the order 175-250 psi. Given that most vehicles generate a nominal air pressure of 100 to 120 psi, the air pressure at the designed ride height may need to be supplemented by an air pressure amplifier or air compressor to provide the desired 175-250 psi air pressure at the designed ride height. Furthermore, an air pressure of 175-250 psi at the designed ride height is significantly higher than the air pressure obtainable using air springs having flexible membranes, and allows for a much higher effective spring rate to be used.

FIG. 9 shows the cylinder shock assembly 50 in a fully compressed state. In its fully compressed state, the spring support 80 has moved a distance $C_{FC}$ of 9 inches. At this distance of compression, the effective spring rate of the cylinder shock assembly 50 is over 13,000 pounds/inch. In addition, the air pressure within the air cylinder float 60 is well over 700 psi, greatly exceeding the maximum service air pressure that can be used with an air spring having a flexible membrane.

There are a number of significant advantages of using the cylinder shock assembly 50 when compared to an air spring having a flexible membrane. As previously noted, because the air cylinder float 60 is non-expandable, significantly higher air pressures can be used with the shock cylinder assembly, e.g., 1000 psi or higher, as opposed to a maximum service pressure of 200 psi for an air spring with a flexible membrane. As a direct result of the significantly higher achievable air pressures, the cylinder shock assembly 50 can operate with a significantly higher effective spring rate. The ability to provide a significantly higher effective spring rate at the designed ride height provides for improved vehicle performance. For example, the vehicle may achieve improved vehicle handling and lateral stability properties. As noted above, the need for auxiliary anti-roll devices that would otherwise be required may be eliminated.

Additionally, more favorable Eigen frequencies or ride frequencies between the front and rear of the vehicle may be provided as they may be more effectively balanced. In addition, a lower, improved roll gradient may be provided as well as a higher, improved understeer gradient. Furthermore, a more progressive spring rate to peak jounce loads may be achieved.

Further advantages include greater durability. The rubber material used as the expandable membrane in certain air springs is prone to fatigue and wearing out compared to solid metal air cylinder float 60. Moreover, the rubber material is UV and ozone sensitive, and more prone to damage from small debris or rock strikes than a solid metal air cylinder float. Therefore, cylinder shock assembly 50 can provide a more durable, longer lasting alternative to an air spring with a flexible membrane. Cylinder shock assembly 50 may provide significant cost savings because it will not need to be replaced or repaired as frequently resulting in lower maintenance costs and less vehicle down time, as well as lower replacement and repair costs.

Additional advantages are illustrated in the Figures that follow. FIG. 10 shows cylinder shock assembly 50 in a fully extended state with an air spring 150 having flexible membrane 160 also in a fully extended state of the same length. As can be seen in FIG. 10, the outer diameter 50*d* of cylinder shock assembly 50 is 7.375 inches whereas the outer diameter 150*d* of air spring 150 with flexible membrane 160 having the same length of travel is 10.1 inches. Thus, the diameter 150*d* of air spring 150 is nearly 30% greater than the diameter 50*d* of cylinder shock assembly 50. Of course, cylinder shock assembly 50 is not limited to these dimensions in any way, and may include shorter or longer lengths of travel and, greater or smaller diameters.

As shown in FIG. 10A, the differences are even more dramatic when the comparison between cylinder shock assembly 50 and air spring 150 are made when they are both in a fully compressed state. For example, in the fully compressed state, fully compressed diameter 50*d'* of cylinder shock assembly 50 remains at 7.375 inches because the air cylinder float is solid and does not expand, whereas the fully compressed diameter 150*d'* of expandable member 160 of air spring 150 expands to 11.5 inches, or more than 50% more than the fully compressed diameter 50*d'* of cylinder shock assembly 50.

As is apparent from FIGS. 10 and 10A, cylinder shock assembly 50 has significant advantages in terms of the amount of space required. This is particularly advantageous when installed on vehicles having limited space requirements. Of course, to provide an air spring with an expandable membrane having comparable spring rates to cylinder shock assembly 50 at the designed ride height, the size of the air spring 150 would need to be made even larger than shown in FIGS. 10 and 10A. As a result of the smaller size of cylinder shock assembly 50 that may be used as compared to air spring 150, significant weight savings are achievable as well. For example, in a preferred embodiment of cylinder shock assembly 50 shown in FIGS. 10 and 10A, cylinder shock assembly has a weight of 59 pounds whereas air spring 150 has a weight of 74 pounds, a difference of 15 pounds. A single 4-wheeled vehicle typically uses two struts in the front and two struts in the rear that would result in a vehicle weight savings of 60 pounds.

An additional advantage provided by the design of cylinder shock assembly 50 is a continuously increasing spring rate that provides smoother transition as a load is applied than using a generally linear spring rate with a bump stop resulting in an abrupt change in slope of the spring rate.

Cylinder shock assembly 50 may be used on a variety of vehicles, including on or off highway truck applications. Cylinder shock assembly 50 also provides the ability to control the suspension and vehicle height setting for transportation and performance enhancement on certain road profiles and terrains. In some applications, fluid may be added into the air cylinder float 60 such that the volume of air within the air cylinder float 60 is reduced resulting in higher air pressures. In addition, a compressible fluid could also be used to provide even additional fine tuning to the effective spring rate of the cylinder shock assembly.

Figure 14:
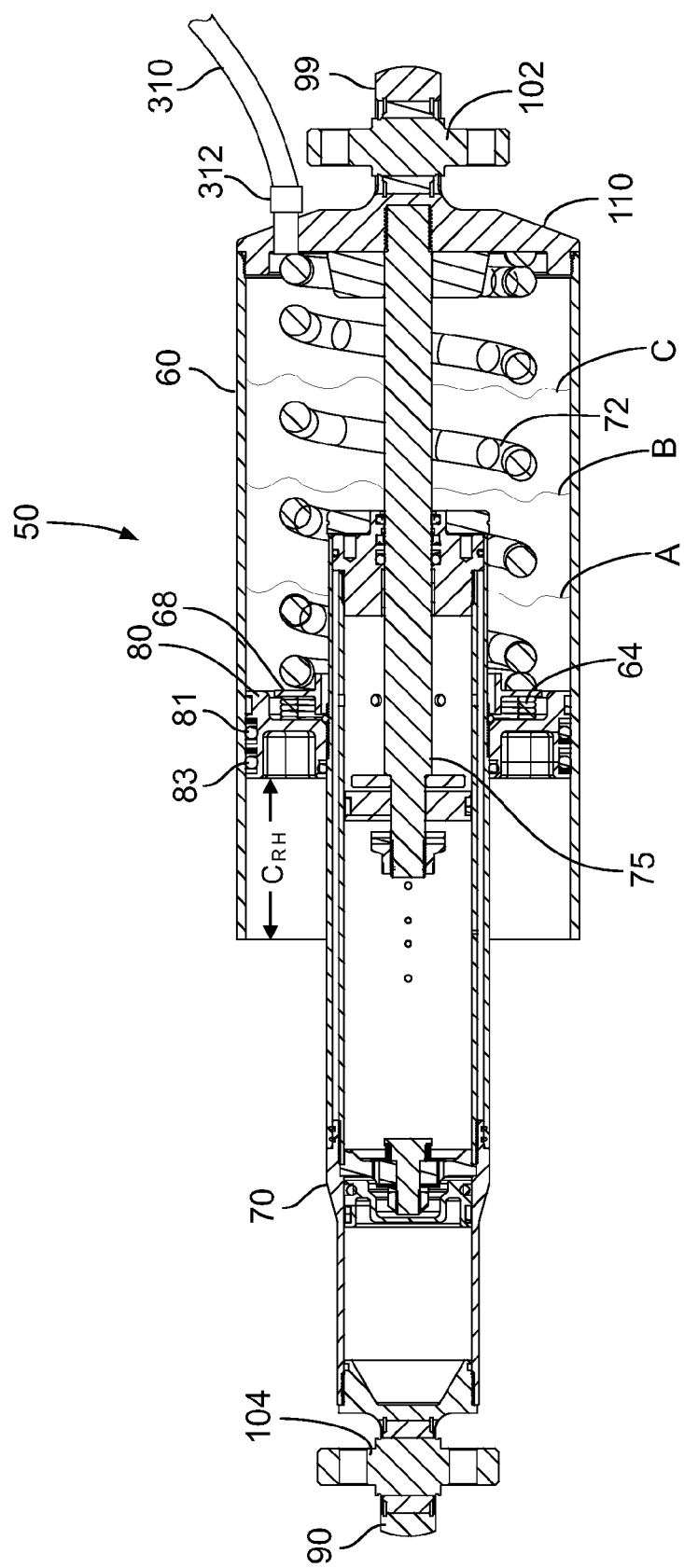
FIG. 14 is the sectional view of FIG. 8, illustrating various levels of fluid that may be added within the air cylinder float to affect the effective spring rate.

FIG. 14 shows cylinder shock assembly 50 of FIG. 8 having a fluid intake port 312 positioned in end cap 110 through which fluid, such as hydraulic fluid or oil may be introduced through hose 310 into air cylinder float 60. As shown in FIG. 14, the amount of fluid within air cylinder float may be varied. For example, where the level of fluid is provided at line A, the effective spring rate of the cylinder shock assembly 50 may be greater than if no fluid were introduced into air cylinder float 60. Similarly, if even more fluid is added into the cylinder air float 60 up to line B, the effective spring rate of the cylinder shock assembly 50 may be increased further. In addition, even more fluid may be added into air cylinder float 60 such that the fluid level is raised to line C, further reducing the volume of the air within the air cylinder float and further increasing the effective spring rate of the cylinder shock assembly 50. Fluid may be removed from the air cylinder float through a small, flexible tube that is inserted into the air cylinder float and connected to fluid intake port 312, and may be drawn out by applying a vacuum to the tube.

The ability to add, or remove, fluid into/from the air cylinder float 60 to change the effective spring rate of the cylinder shock assembly 50 may provide significant advantages. For example, at a normal anticipated ride height the cylinder shock assemblies without fluid may be sufficient to provide the desired spring rate for the vehicle. However, if that vehicle is fully loaded, then the cylinder shock assemblies without fluid may not be sufficient to provide the desired spring rate for the vehicle at a full load, and different, perhaps stronger and larger struts may be required for the vehicle when it is fully loaded. By providing cylinder shock assembly 50 with varying fluid levels within the air cylinder float 60, a desired spring rate for the cylinder shock assembly 50, or multiple cylinder shock assemblies, may be increased when the vehicle is fully loaded, eliminating the need to provide a different strut on the vehicle depending on the size of the anticipated load. Accordingly, cylinder shock assembly 50 may be used, by varying the amount of fluid introduced into, or removed from, the air cylinder float 60, for all expected loading conditions for a vehicle.

In a similar manner, a vehicle may experience a number of varying terrains. For example, a paved road, gravel road, off road, rocky conditions, boulder field, etc. Based on the expected terrain, the effective spring rate of cylinder shock assembly may be adjusted by the introduction of fluid into the air cylinder float 60. For example, for expected paved terrain, perhaps no fluid is introduced into air cylinder float 60, or fluid is removed from air cylinder float 60. However, for a rougher expected terrain, fluid may be introduced (or removed) through fluid inlet port 312 into air cylinder float 60 to level A, or level B, or points in between to provide an adjusted effective spring rate for cylinder shock assembly 50. For rough terrain, fluid may be introduced into air cylinder float 60 to level C, or higher, to provide an even higher expected spring rate for the cylinder shock assembly 50 more suitable for the rougher terrain. In this manner, the effective spring rate of the cylinder shock assembly 50 may be adjusted to accommodate various expected loads and/or terrains, thus providing the ability to adjust the effective spring rate to cover a wide range of expected operating conditions.

Figure 11:
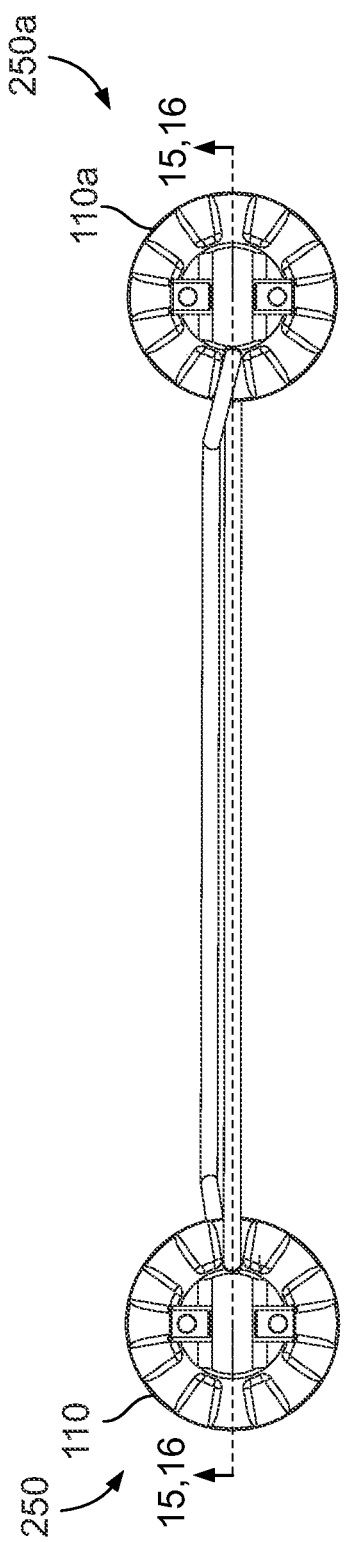
Figure 12:
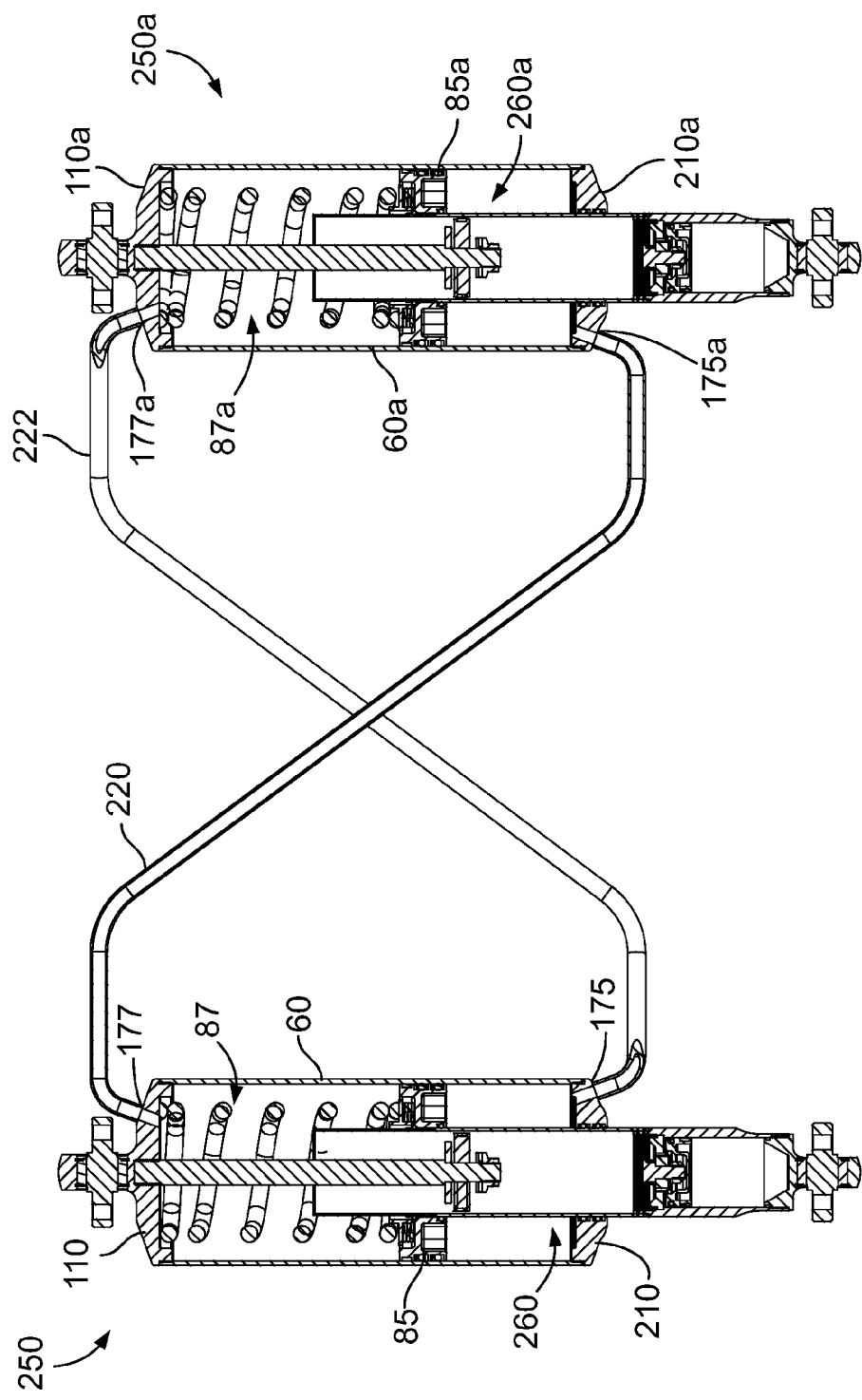
FIG. 12 is sectional view of cylinder shock assembly 250 cross plumbed to cylinder shock assembly 250a at a desired ride height sectioned along line 15, 16 in FIG. 11.
Figure 13:
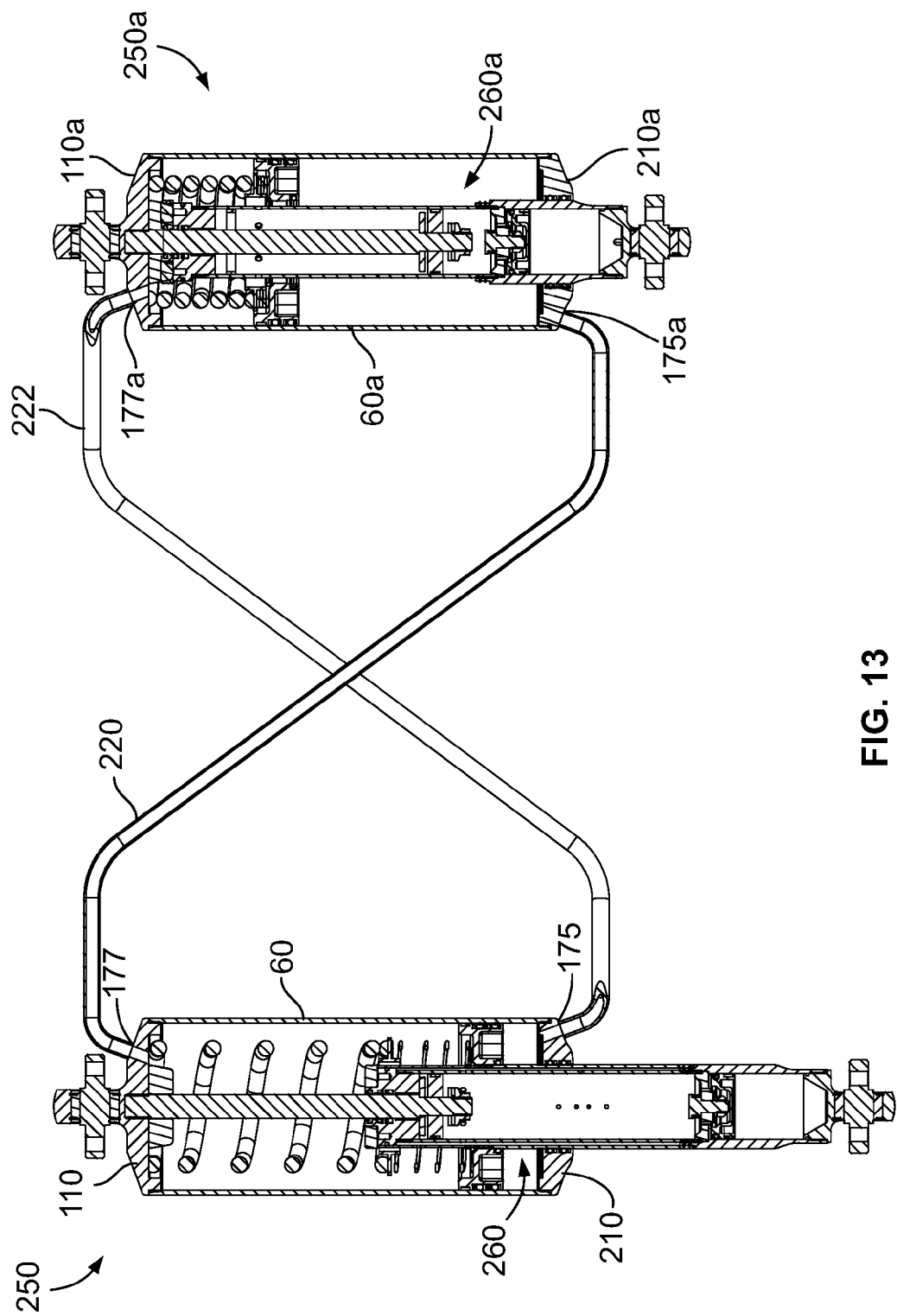
FIG. 13 is a sectional view of the cylinder shock assembly 250 and cylinder shock assembly 250a of FIG. 11 with cylinder shock assembly 250a fully compressed sectioned along line 15, 16 in FIG. 11.

Additionally, it is possible to cross plumb the front and rear struts as well as the left and right side struts to provide even further improved vehicle performance characteristics. FIGS. 11-13 provide examples of the cross plumbing of cylinder shock assemblies may be achieved. Cylinder shock assembly 250 is shown which may be constructed the same as cylinder shock assembly 50 shown in FIGS. 7-9 above, except cylinder shock assembly 250 includes second end cap 210 positioned on the opposite end of air cylinder float 60 than first end cap 110. Cylinder shock assembly 250a may be constructed the same as cylinder shock assembly 250 including second end cap 210a positioned on the opposite end of air cylinder float 60a than first end cap 110a. With the construction of cylinder shock assembly 250, a second air pressure chamber 260 may be formed between second end cap 210 and piston 85. Similarly with the construction of cylinder shock assembly 250a, a second air pressure chamber 260a may be formed between second end cap 210a and piston 85a.

A first end of air hose 220 may be attached to first end cap 110 of cylinder shock assembly 250 at port 177 and a second end of air hose 220 may be attached to second end cap 210a of cylinder shock assembly 250a at port 175a. In a similar fashion a first end of air hose 222 may be attached to first end cap 110a of cylinder shock assembly 250a at port 177a and a second end of air hose 222 may be attached to second end cap 210 of cylinder shock assembly 250a at port 175. In this manner, cylinder shock assemblies 250 and 250a may be cross plumbed with air hoses 220 and 222. Of course, air hoses 220 and 222 could be any type of suitable hose capable of withstanding expected operating pressures, including conventional hydraulic hose.

A manifold may be positioned between the cylinder shock assemblies 250 and 250a having solenoid or mechanical valves to control the pressure between them. Check valves and pressure limiting valves may be used to control the pressure between the cylinder shock assemblies 250 and 250a as desired.

By utilizing a second air pressure chamber 260 and 260a, the effective spring rates of cylinder shock assemblies 250 and 250a may be combined. As piston 85 is compressed in cylinder shock assembly 250, the first air pressure chamber 87 is in communication (via air hose 220) with second air pressure chamber 260a within cylinder shock assembly 250a. Likewise, when piston 85a is compressed in cylinder shock assembly 250a, the first air pressure chamber 87a is in communication (via air hose 222) with second air pressure chamber 260 within cylinder shock assembly 250.

There are a number of advantages obtainable when separate cylinder shock assemblies are cross plumbed. In the case of side to side, or "cross car," plumbing, the cross plumbing may advantageously influence roll stability. For example, during a roll maneuver, such as traversing a lane change, s-bend, or during cornering etc., the suspension is subjected to an overturning moment. When an overturning moment is applied to a suspension the springs on both sides of the suspension deflect in opposite directions producing a roll angle. The roll stiffness can be defined as the ratio of this moment to the roll angle of the suspension. Minimizing this relative deflection will reduce the roll angle and therefore increase the vehicle stability. Increasing the vertical spring rates will reduce this relative deflection by allowing the adjacent cylinder shock assemblies to "cross talk" or communicate together and can significantly reduce this relative deflection.

This moment of the suspension, that develops opposing suspension deflection, produces jounce on one side of the vehicle and rebound on the other side. During a left turn, for example, the left side spring will extend and the right side spring will compress. The spring rate reduces in rebound and increases in jounce. The magnitude of the difference in these spring rates will influence the roll stiffness characteristics.

In the case of the dual, or cross plumbed, cylinder shock assemblies, the spring rate change can be used to balance left vs. right. Upper air chamber 260 on right side cylinder shock assembly 250 is interconnected with lower air chamber 87a on left side cylinder shock assembly 250a allowing a pressure balance between the 'jounce' side and 'rebound' sides of the suspension. The air flow across these cylinders and between these chambers can be regulated to provide a desired and/or defined roll characteristic for stability, handling and understeer optimization.

Cross plumbing a front cylinder shock assembly with a rear cylinder shock assembly may also advantageously have an influence on pitch motion. Similar to "cross car" plumbing, cylinder shock assemblies may be plumbed fore/aft along the vehicle's longitudinal axis extending from the front to the rear of the vehicle. Plumbing scenarios could include steer axle to rear axle or tandem drive axles. Pitch motion optimization between front and rear suspensions or tandem drive suspension may be possible to improve ride behavior, limit heave motion, reduce brake dive, or axle hop, as examples.

FIG. 12 shows a sectional view of cylinder shock assemblies 250 and 250a at a designed ride height sectioned along line 15, 16 in FIG. 11, whereas FIG. 13 shows a sectional view of cylinder shock assembly 250a in a fully compressed state and cylinder shock assembly 250 in a partially compressed state sectioned along line 15, 16 in FIG. 11. Cylinder shock assemblies 250 and 250a could be positioned on either side of a vehicle suspension laterally as shown in FIGS. 1-3, or could be positioned longitudinally from each other such that one of the cylinder shock assemblies 250 or 250a is positioned in the front of the vehicle and the other is positioned in the back of the vehicle. It is also possible to cross plumb two cylinder shock assemblies in the front and two cylinder shock assemblies in the rear such that the front and rear, as well as right and left sides of the vehicle are interconnected. In this manner, it is possible to achieve additional vehicle stability and ride performance. Furthermore, cross plumbing between the front and rear may also provide load equalization between axles similar to a walking beam suspension for tandem axle applications.

In addition, if the vehicle is equipped with an air amplifier or air compressor, then additional air may be pumped into the cylinder shock assemblies 50 or 250 to further increase the effective spring rate of the cylinder shock assembly. Thus, a vehicle operator may be able to adjust the effective spring rate by having more air pumped into the cylinder shock assemblies 50 or 250 to achieve a desired effective spring rate for the vehicle. For example, a vehicle operator may experience a change in terrain from a relatively smooth terrain, to a relatively bumpy or rocky terrain and desire an increased effective spring rate for suitable for the new terrain. Conversely, the vehicle operator may also have the ability to bleed air from with cylinder shock assemblies 50 and 250 to reduce the air within, and therefore the air pressure within, and effectively decrease the effective spring rate of the cylinder shock assemblies as desired.

Example embodiments of the present embodiments have been described above. Those skilled in the art will understand that changes and modifications may be made to the described embodiments without departing from the true scope and spirit of the present invention, which is defined by the claims.

We claim:

1. A cylinder shock assembly, comprising:
a damper having a first end and a second end, wherein the first end includes a first mount and the second end of the damper extends into an air cylinder float;
the damper includes a housing defining a cavity, the damper having a rod positioned in the air cylinder float, the rod having a first end positioned within the cavity of the damper and a second end affixed to an end cap that is connected to a first end of the air cylinder float;
a first piston affixed to the first end of the rod within the cavity of the damper,
a second piston affixed to the damper, the second piston having one or more seals on an outer surface thereof that sealingly engage an inner surface of the air cylinder float;
a primary coil spring positioned within the air cylinder float and about the rod and positioned between the second piston and the end cap;
wherein when a load applied to the cylinder shock assembly is increased, the second piston and the second end of the damper move towards the end cap compressing air within the air cylinder float;
wherein as the load is increased the primary coil spring is compressed and the volume of air within the air cylinder decreases resulting in an increased air pressure;
wherein the primary coil spring and the volume of air within the air cylinder float provide an effective spring rate for the cylinder shock assembly; and wherein the air cylinder float is a solid member that does not expand as the air pressure within increases during compression.

2. The cylinder shock assembly of claim 1, wherein at a designed vehicle ride height the air pressure within the air cylinder float is over 175 psi.

3. The cylinder shock assembly of claim 2, wherein at the designed vehicle ride height the air pressure within the air cylinder float is between 175 and 250 psi.

4. The cylinder shock assembly of claim 1, wherein when the second piston has been compressed between 3.75 and 4.25 inches into the air cylinder float, the air pressure within the air cylinder float is between 175 and 250 psi inclusive.

5. The cylinder shock assembly of claim 1, further including a tender spring positioned within the air cylinder float in series with the primary coil spring.

6. The cylinder shock assembly of claim 5, further including a spring adaptor positioned between the primary coil spring and the tender spring.

7. The cylinder shock assembly of claim 1, wherein the primary coil spring has a spring rate of 600 pounds/inch.

8. The cylinder shock assembly of claim 1, wherein the effective spring rate of the cylinder shock assembly is over 1500 pounds/inch at a designed ride height.

9. The cylinder shock assembly of claim 8, wherein the effective spring rate of the cylinder shock assembly is between 1500-2000 pounds/inch at the designed ride height.

10. The cylinder shock assembly of claim 1, where the assembly may be compressed from 0 to 9 inches.

11. The cylinder shock assembly of claim 10, wherein at full compression, a diameter of the air cylinder float is less than 8 inches.

12. The cylinder shock assembly of claim 10, wherein at full compression, the diameter of the air cylinder float is between 7.375 and 8 inches inclusive.

13. The cylinder shock assembly of claim 10, wherein the weight of the assembly is less than 70 pounds.

14. The cylinder shock assembly of claim 13, wherein the weight of the assembly is 60 pounds or less.

15. The cylinder shock assembly of claim 1, wherein the effective spring rate of the assembly is continuously increasing as the assembly is compressed.

16. The cylinder shock assembly of claim 1, wherein the effective spring rate of the assembly has no discontinuities or changes in slope as the assembly is compressed.

17. The cylinder shock assembly of claim 1, wherein the second piston comprises a spring support that abuts an end of the primary coil spring.

18. The cylinder shock assembly of claim 1, wherein the second piston comprises a spring support that abuts an end of a tender spring.

19. The cylinder shock assembly of claim 1, further including a second mount positioned on the end cap for attachment to the vehicle.

20. The cylinder shock assembly of claim 1, wherein the air pressure within the air cylinder float when the assembly is fully compressed is between 700 and 1000 psi.

21. A cylinder shock assembly, comprising:
  a damper having a first end and a second end, wherein the first end includes a first mount and the second end of the damper extends into an air cylinder float;
  the damper includes a housing defining a cavity, the damper having a rod positioned in the air cylinder float, the rod having a first end positioned within the cavity of the damper and a second end affixed to a first end cap that is connected to a first end of the air cylinder float;
  a first piston affixed to the first end of the rod within the cavity of the damper,
  a second piston affixed to the damper, the second piston having one or more seals on an outer surface thereof that sealingly engage an inner surface of the air cylinder float;
  a primary coil spring positioned within the air cylinder float and about the rod and positioned between the second piston and the first end cap;
  wherein when a load applied to the cylinder shock assembly is increased, the second piston and the second end of the damper move towards the end cap compressing air within a first air pressure chamber in the air cylinder float;
  wherein as the load is increased the primary coil spring is compressed and the volume of air within the first air pressure chamber decreases resulting in an increased air pressure;
  wherein the damper extends through a second end cap positioned on a second end of the air cylinder float wherein a second air pressure chamber is formed in the air cylinder float between the second piston and the second end cap; and
  wherein the air cylinder float is a solid member that does not expand as the air pressure within increases during compression.

22. A suspension system comprising:
  a first cylinder shock assembly as claimed in claim 21, and a second cylinder shock assembly as claimed in claim 21, wherein a first end of a first air hose is connected to the first end cap of the first cylinder shock assembly and a second end of the first air hose is connected to the second end cap of the second cylinder shock assembly such that the first air pressure chamber in the first cylinder shock assembly is in communication with the second air pressure chamber of the second cylinder shock assembly.

23. The suspension system of claim 22, wherein a first end of a second air hose is connected to the second end cap of the first cylinder shock assembly and a second end of the second air hose is connected to the first end cap of the second cylinder shock assembly such that the second air pressure chamber in the first cylinder shock assembly is in communication with the first air pressure chamber of the second cylinder shock assembly.

24. A cylinder shock assembly, comprising:
  a damper having a first end and a second end, wherein the second end of the damper extends into an air cylinder float;
  the damper includes a housing defining a cavity, the damper having a rod positioned in the air cylinder float, the rod having a first end positioned within the cavity of the damper and a second end affixed to an end cap that is connected to a first end of the air cylinder float;
  a first piston affixed to the first end of the rod within the cavity of the damper,
  a second piston affixed to the damper, the second piston having one or more seals on an outer surface thereof that sealingly engage an inner surface of the air cylinder float;
  a primary coil spring positioned within the air cylinder float and about the rod and positioned between the second piston and the end cap;
  wherein when a load applied to the cylinder shock assembly is increased, the second piston and the second end of the damper move towards the end cap compressing air within the air cylinder float;
  wherein as the load is increased the primary coil spring is compressed and the volume of air within the air cylinder decreases resulting in an increased air pressure;
  wherein the primary coil spring and the volume of air within the air cylinder float provide an effective or desired spring rate for the cylinder shock assembly;
  wherein fluid introduced into the air cylinder float provides an adjustable effective spring rate;
  and wherein the air cylinder float is a solid member that does not expand as the air pressure within increases during compression.

25. The cylinder shock assembly of claim 24, wherein fluid introduced into the air cylinder float adjusts the effective spring rate.

26. The cylinder shock assembly of claim 24, wherein a first volume of fluid introduced into the air cylinder float adjusts a first effective spring rate.

27. The cylinder shock assembly of claim 26, wherein an additional volume of fluid introduced into the air cylinder float provides a second effective spring rate.

28. The cylinder shock assembly of claim 24, wherein at a designed vehicle ride height the air pressure within the air cylinder float is over 175 psi.

29. The cylinder shock assembly of claim 28, wherein at the designed vehicle ride height the air pressure within the air cylinder float is between 175 and 250 psi.

30. The cylinder shock assembly of claim 24, wherein the effective spring rate of the cylinder shock assembly is over 1500 pounds/inch at a designed ride height.

31. The cylinder shock assembly of claim 30, wherein the effective spring rate of the cylinder shock assembly is between 1500-2000 pounds/inch at the designed ride height.

32. A method of adjusting the effective spring rate of a cylinder shock assembly comprising the steps of:
providing a cylinder shock assembly comprising:
a damper having a first end and a second end, wherein the second end of the damper extends into an air cylinder float; wherein
the damper includes a housing defining a cavity, the damper having a rod positioned in the air cylinder float, the rod having a first end positioned within the cavity of the damper and a second end affixed to an end cap that is connected to a first end of the air cylinder float;
a first piston affixed to the first end of the rod within the cavity of the damper,
a second piston affixed to the damper, the second piston having one or more seals on an outer surface thereof that sealingly engage an inner surface of the air cylinder float;
a primary coil spring positioned within the air cylinder float and about the rod and positioned between the second piston and the end cap;
wherein the primary coil spring and the volume of air within the air cylinder float provide an effective spring rate for the cylinder shock assembly;
wherein the air cylinder float is a solid member that does not expand as the air pressure within increases during compression; and
adding a first volume of fluid into the air cylinder float to increase the effective spring rate of the cylinder shock assembly to a first effective spring rate.

33. The method of claim 32, further including the step of adding an additional second volume of fluid into the air cylinder float to increase the effective spring of the cylinder shock assembly to a second effective spring rate.

34. The method claim 32, wherein at a designed vehicle ride height the air pressure within the air cylinder float is over 175 psi.

35. The method of claim 34, wherein at the designed vehicle ride height the air pressure within the air cylinder float is between 175 and 250 psi.

36. The method of claim 32, wherein the effective spring rate of the cylinder shock assembly is over 1500 pounds/inch at a designed ride height.

37. The method of claim 36, wherein the effective spring rate of the cylinder shock assembly is between 1500-2000 pounds/inch at the designed ride height.

38. The method of claim 32, further including the step of removing fluid from the air cylinder float from the first volume of fluid to decrease the effective spring rate of the cylinder shock assembly.

* * * * *